C. THOMAS.
Landau.

No. 160,039 — Patented Feb. 23, 1875.

Witnesses:
S. N. Piper
J. R. Snow

Chauncey Thomas.
by his attorney
R. H. Eddy

THE GRAPHIC CO. PHOTO-LITH. 39 & 41 PARK PLACE, N.Y.

UNITED STATES PATENT OFFICE.

CHAUNCEY THOMAS, OF BOSTON, MASSACHUSETTS.

IMPROVEMENT IN LANDAUS.

Specification forming part of Letters Patent No. 160,039, dated February 23, 1875; application filed November 4, 1874.

*To all whom it may concern:*

Be it known that I, CHAUNCEY THOMAS, of Boston, of the county of Suffolk and State of Massachusetts, have invented a new and useful Improvement in Landaus; and do hereby declare the same to be fully described in the following specification and represented in the accompanying drawings, of which—

Figure 1:
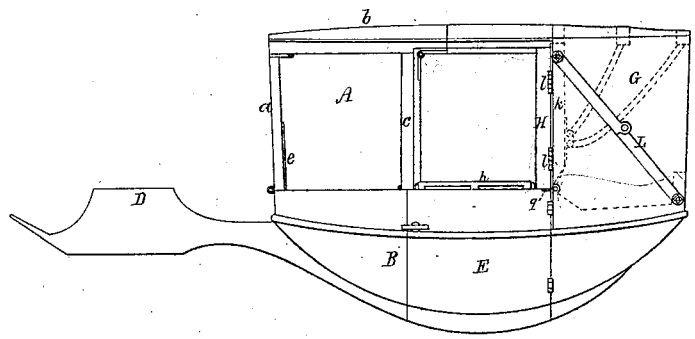
Figure 4:
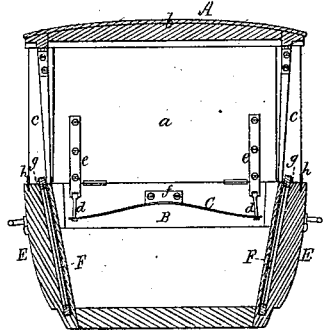
Figure 2:
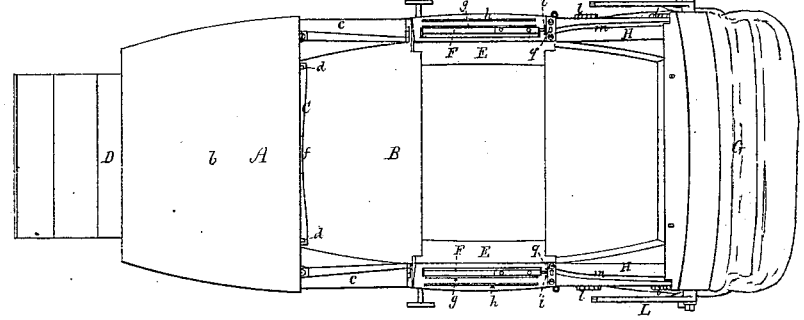
Figure 5:
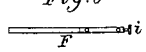
Figure 6:
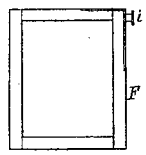
Figure 7:
Figure 8:
Figure 9:

Figure 1 is a side elevation of a landau with my invention. Fig. 2 is a top view, and Fig. 3 a side elevation, of such carriage as open, or with its front and rear hoods lowered down. Fig. 4 is a transverse section, showing the balancing devices of the front hood. Fig. 5 is a top view, and Fig. 6 a side view, of one of the door-windows. Fig. 7 is a bottom view, Fig. 8 a side elevation, and Fig. 9 a vertical section, of one of the rear window-posts of one of the doors.

Figure 10:

In this carriage the front hood A is to have glass windows in its sides and front, the side windows having frames provided with glass panes and hinged to the front, the said hood being composed of a front, $a$, a roof portion, $b$, and two posts or standards, $c\ c$. The front and the standards are so hinged to the carriage-body B, and also to the roof portions $b$, as to enable the hood to be turned from the upright position shown in Fig. 1 down into one as exhibited in Figs. 2 and 3, all of which construction and mode of operation are not my invention; but in carrying out my invention, in part, I have combined with the carriage-body and such a hood, an elastic counter-balance composed of a spring, C, two connecting-rods, $d\ d$, and two arms, $e\ e$. The arms are fastened to and extend downward from the front $a$, and are hinged or jointed to the connecting-rods, which extend down from the arms to, and are fixed to, the spring at or near its opposite ends. The said spring, arranged against the inner surface of the front end of the body, is fastened at its middle to a bracket, $f$, projecting therefrom, all being arranged as represented. The spring connected with the body and the front portion of the hood, by means as described, answers to counterbalance the hood while in the act of being thrown down, and also to prevent its glass windows from being broken by concussion incident to a sudden depression of the hood and its fall upon the seat supporter or portion D of the carriage-body. Each of the doors E E I provide, as usual, with a chamber to receive a glass window, F, to slide up and down in the door. I also furnish the door in the rabbet $g$, or sill next the window-chamber, with a holding-ledge, $h$, erected on the rabbet, and parallel to its vertical side, and at a sufficient distance therefrom for the lower part of the window-frame to go between the two. The frame of the window F I provide, at or near its rear upper corner, with a headed stud, $i$, formed as shown. To each front part $k$ of the back hood G I connect, by hinges $l\ l$, a door-post, H, to turn in and out with the door. This post, however, is separate from the door, and, when in an upright position, projects over the door in manner as shown in Fig. 1. The post, on its front face, has a curved groove, $m$, made in it to receive the headed stud $i$, and hold the window while it may be in the act of being either raised or lowered, the groove being dovetailed or made in cross-section, as shown in Fig. 10, which is a transverse section of the post. Furthermore, there is in the upper part of the groove a spring, $n$, provided at top with a shoulder, $o$, all being as shown. While the shoulder serves to limit the vertical movement of the window, the spring, by bearing against the head of the stud $i$, serves to prevent rattling of the window. At its foot the post has fixed to it a plate, $p$, having a hole or mortise in it to take upon and receive a tenon, $q$, extended upward from the door. This tenon I usually support on a spring, such as will allow the tenon to be forced down in the door in case the plate $p$ should project over and not receive the tenon, while the hood may be in the act of being turned up.

Figure 3:
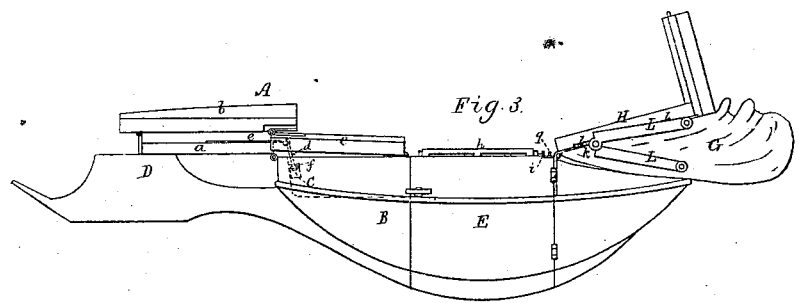

It is not intended for the back hood to be turned down while the door-window is up, as the window should first be lowered down into its chamber in the door. When, however, the window is up and resting on the sill, it will be held in place at bottom by the rabbet and the ledge $h$, and at top by the post $k$ and the stud $i$. On opening the door the post and the window will move with it, the window being duly supported by the door, the ledge $h$, the post $k$, and the stud $i$. On raising the window a little and pulling it back over its chamber, it may be lowered into such chamber. Next, by throwing down the hood braces or toggles L L at their middle joints, the hood with the two posts may be thrown down into positions, as shown in Figs. 2 and 3.

I claim as my invention in the landau the following, viz:

1. The combination of the counter-balance, consisting of the spring C, the connections $d$ $d$, and the arms $e$ $e$, with the body B and the front hood A, as described.

2. The post H, separate from the door E, and grooved and hinged to the hood G, in combination with the window F, provided with the headed stud $i$, to operate in the groove of the post, all as set forth.

3. The combination of the ledge $h$ with the rabbet $g$ of the door and the grooved post H and stud $i$, applied to the window and back hood, as specified.

4. The combination of the mortised plate $p$ and the tenon $q$ with the door and the grooved post H, separate from such door and hinged to the back hood G, all substantially as set forth.

5. The combination of the spring-stop $n$ $o$ with the grooved post H, hinged to the back hood, and the window provided with the headed stud $i$, all to operate as set forth.

CHAUNCEY THOMAS.

Witnesses:
R. H. EDDY,
J. R. SNOW.